United States Patent
Terranova et al.

(10) Patent No.: US 7,672,454 B2
(45) Date of Patent: Mar. 2, 2010

(54) METHOD FOR COPY PROTECTION OF DIGITAL CONTENT

(75) Inventors: Sabine Terranova, Stuttgart (DE); Alexander Vollschwitz, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 1019 days.

(21) Appl. No.: 11/023,781

(22) Filed: Dec. 28, 2004

(65) Prior Publication Data
US 2005/0141708 A1  Jun. 30, 2005

(30) Foreign Application Priority Data
Dec. 29, 2003  (EP) ................. 03029929

(51) Int. Cl.
H04N 7/167 (2006.01)
(52) U.S. Cl. ............... 380/201; 380/37; 380/204; 726/26; 369/84; 369/85
(58) Field of Classification Search ........ 713/189; 380/201, 202, 203, 204, 37, 200; 369/85; 705/58
See application file for complete search history.

(56) References Cited

U.S. PATENT DOCUMENTS

| | | | |
|---|---|---|---|
| 4,888,798 A | 12/1989 | Earnest | |
| 5,892,899 A | 4/1999 | Aucsmith et al. | |
| 7,095,853 B2 * | 8/2006 | Morishita | 380/201 |
| 7,111,173 B1 * | 9/2006 | Scheidt | 713/186 |
| 2002/0126874 A1 * | 9/2002 | Haruki | 382/100 |
| 2003/0231767 A1 * | 12/2003 | Carbajal | 380/200 |
| 2004/0003268 A1 * | 1/2004 | Bourne et al. | 713/193 |
| 2004/0024688 A1 * | 2/2004 | Bi et al. | 705/37 |
| 2004/0158709 A1 * | 8/2004 | Narin et al. | 713/156 |
| 2004/0184605 A1 * | 9/2004 | Soliman | 380/44 |
| 2005/0027991 A1 * | 2/2005 | DiFonzo | 713/185 |
| 2005/0198051 A1 * | 9/2005 | Marr et al. | 707/100 |
| 2006/0026569 A1 * | 2/2006 | Oerting et al. | 717/126 |

(Continued)

FOREIGN PATENT DOCUMENTS

GB  2 373 091  9/2002

(Continued)

OTHER PUBLICATIONS

"How disks are 'padlocked'." 8045 IEEE Spectrum; Jun. 23, 1986, No. 6, New York, USA. pp. 32-40, XP-002054317.

(Continued)

*Primary Examiner*—Kimyen Vu
*Assistant Examiner*—April Y Shan
(74) *Attorney, Agent, or Firm*—Oblon, Spivak, McClelland, Maier & Neustadt, L.L.P.

(57) ABSTRACT

A method for copy protection of digital content, wherein at least a part of the digital content is an active part enabling the execution of the digital content, includes steps of storing digital content in a storage, choosing reference storage blocks from the storage, creating dependencies between the digital content and the chosen reference storage blocks and executing by way of the active part the digital content only after verification of the dependencies in order to verify the presence of the chosen reference storage blocks. A storing medium also includes a digital content being copy protected according to the method and to a reproducing apparatus executes the steps of the above-described method.

8 Claims, 5 Drawing Sheets

U.S. PATENT DOCUMENTS

2006/0253713 A1\* 11/2006 Terranova et al. ........... 713/194
2007/0033419 A1\* 2/2007 Kocher et al. ............... 713/193
2008/0270804 A1\* 10/2008 Terranova et al. ........... 713/189

FOREIGN PATENT DOCUMENTS

| JP | 08-286840 | \* | 11/1996 |
| JP | 11-250572 | \* | 9/1999 |
| WO | WO 03/012603 | | 2/2003 |

OTHER PUBLICATIONS

Ross Anderson et al.; "The Steganographic File System" David Aucsmith (Ed.): Information Hiding 1998, LNCS 1525, pp. 73-82, 1998. Springer-Verlag Berlin Heidelberg 1998.

S. Chow et al.; "A White-Box DES Implementation for DRM Applications"; Oct. 15, 2002; Pre-proceedings for ACM DRM-2002 workshop. 16 pages.

Ahmet M. Eskicioglu et al. "An overview of multimedia content protection in consumer eletronics devices"; Thomson Consumer Electronics Corporate Research, Video and Image Processing Laboratory (VIPER) School of Electrical and Computer Engineering. 18 pages, Dec. 20, 1996.

Stuart E. Schechter et al.; May 29, 2003, "Trusted Computing, Peer-To-Peer Distribution, and the Economics of Pirated Entertainment"; Presented at *The Second Annual Workshop on Economics and Information Security*, College Park, Maryland, May 29-30, 2003. 11 pages.

Mark Stamp, "Digital Rights Management: the Technology Behind the Hype"; Computer Science Department San Jose State University, vol. 4, No. 3, 2003. pp. 102-112, 2002.

J.R. Nickerson et al.; "Tamper Resistant Software: Extending Trust into a Hostile Environment"; Cloakware Corporation. pp. 64-67, 2001.

\* cited by examiner

METHOD FOR COPY PROTECTION OF DIGITAL CONTENT

BACKGROUND OF THE INVENTION

1. Field of Invention

The invention relates to a method for copy protection of digital content according to claim 1, to a storing medium comprising digital content being copy protected according to the method and to a reproducing apparatus for executing the steps of the method.

2. Description of the Related Art

Digital technology not only allows to digitise contents, such as still images, audio and films, but also to make perfect copies of contents, once it is digitised. Digital contents can be copied perfectly, allowing an unlimited number of copy generations. While this is convenient for content consumers, it poses various problems for content producers and results in an extraordinary monetary damage both for the owner of the respective intellectual property and for the resellers and support providers.

Therefore, the providers of digital data are searching for solutions to prevent manufacture and distribution of illegally copied digital data.

Most of the prior art addresses the problem of copying by transforming the digital contents into an illegible form, e.g. by scrambling or encrypting it using cryptographic techniques. Consumption of content is now only possible with additional knowledge and/or techniques, e.g. a decryption key or an unscrambling algorithm. Merely copying contents is still possible, but no longer sufficient for the consumption of the contents. Such methods are commonly referred to as digital right management (DRM).

Replaying DRM protected contents on computers usually requires installation of appropriate DRM software. This, however, may be problematic when legitimate owners of digital contents want to move their collections of contents, and with it the necessary DRM system components to a new location, e.g. a newly bought computer or from home to the car stereo system or the like. Another problem of current DRM technology are threads from so-called system level attacks: to ensure compatibility of a given DRM enabled player with all contents available for it, all instances of this player are essentially identical. Breaking one instance potentially comprises all instances, i.e. the whole system. Further, DRM employ copy protection methods such as passwords, keywords or licences, which have to be input by the user whenever consuming some contents, which is not user-friendly.

A first step towards solving the above problems is the use of active contents, where contents are merged with the methods for its protection. Active contents comprise a passive part, which is digital content such as still image, audio track, a video sequence, text content or the like and an active part, providing DRM methods for the protection of the passive part. As common in the prior art, the passive part is transformed by the content provider and to an illegible form, e.g. by encryption. The active part is some form of executable code, capable of inverse transforming the passive part and thus making it available for consumption. The active part also implements methods governing the usage of the contents contained in the passive part, such as replay and copying. That way it reflects the usage rules devised by the content provider.

A problem of the above described active content is, that active content on its own cannot decide for a given copy whether it is an original or a copy. Active contents can be copied perfectly, just as ordinary digital contents can. Executing the original and the copy of a fully self-contained active content necessarily leads to the exact same result, which would foil any DRM effort. Active content therefore needs some form of external information with which it can upon instantiation recognise its environment and/or retrieve its previous instantiation state.

It is therefore an object of the present invention to provide a method for copy protection of digital content, which highly discourages illegal copying of digital content and which is independent from DRM systems and therefore very user-friendly as the user does not have to administrate keywords, passwords or licences required for DRM systems.

This object is achieved by a method as defined in claim 1.

SUMMARY OF THE INVENTION

According to the present invention, a method for copy protection of digital content, whereby at least a part of the digital content is an active part enabling the execution of the digital content, is revealed comprising the steps of storing digital content in a storage, choosing reference storage blocks from the storage, creating dependencies between the digital content and the chosen reference storage blocks and executing by means of the active part the digital content only after verification of the dependencies in order to verify the presence of the chosen reference storage blocks.

By creating dependencies between the digital content and reference storage blocks of the storage into which the digital content is stored and by executing the digital content only after the verification of the presence of the reference storage blocks, the digital content is embedded into a large amount of surrounding data and the execution and copying of the digital content in another storage is prevented. In addition, the execution of the digital content is not dependent on the use of licences or the like, which makes it more user friendly.

Preferably the method comprises dividing the digital content into content blocks.

Further preferably the method comprises feeding a seed to a key stream generator for generating a key.

Advantageously the method comprises encrypting one content block with the generated key.

Further advantageously the method comprises calculating cover keys for verifying the dependencies on the basis of the key and the chosen reference storage blocks.

Preferably the method comprises storing the cover keys and the storage block indices of the chosen reference storage blocks together with the encrypted digital content block in the storage.

The method can comprises feeding the generated key back to the key stream generator for generating the next key for encrypting the next content block.

Advantageously the method comprises repeating the steps of embedding the digital content for every content block.

Further, advantageously for decrypting the encrypted content block the following steps are executed:

I) generating the first key for decrypting the first encrypted active content block, II) decrypting the encrypted content block with the respective key, III) repeating steps I) and II) for the next encrypted content block and IV) randomly choosing encrypted content blocks for which user rights shall be verified.

Preferably for verifying the dependencies in order to verify the presence of the chosen reference storage blocks, the following steps are executed:

V) reading out at least one cover key and the storage block indices stored together with the encrypted content block, VI) calculating a control key on the basis of at least one cover key and at least one reference storage block indicated by the indices and VII) using the control key for decrypting the encrypted content block.

The method can comprise feeding the generated key or the calculated control key back to the key stream generator for generating the next key for decrypting the next encrypted content block in case that no verification has to be accomplished.

Embodiments of the invention will now be described, by way of example only, with reference to the accompanying drawings in which:

DETAILED DESCRIPTION OF THE INVENTION

Figure 1:
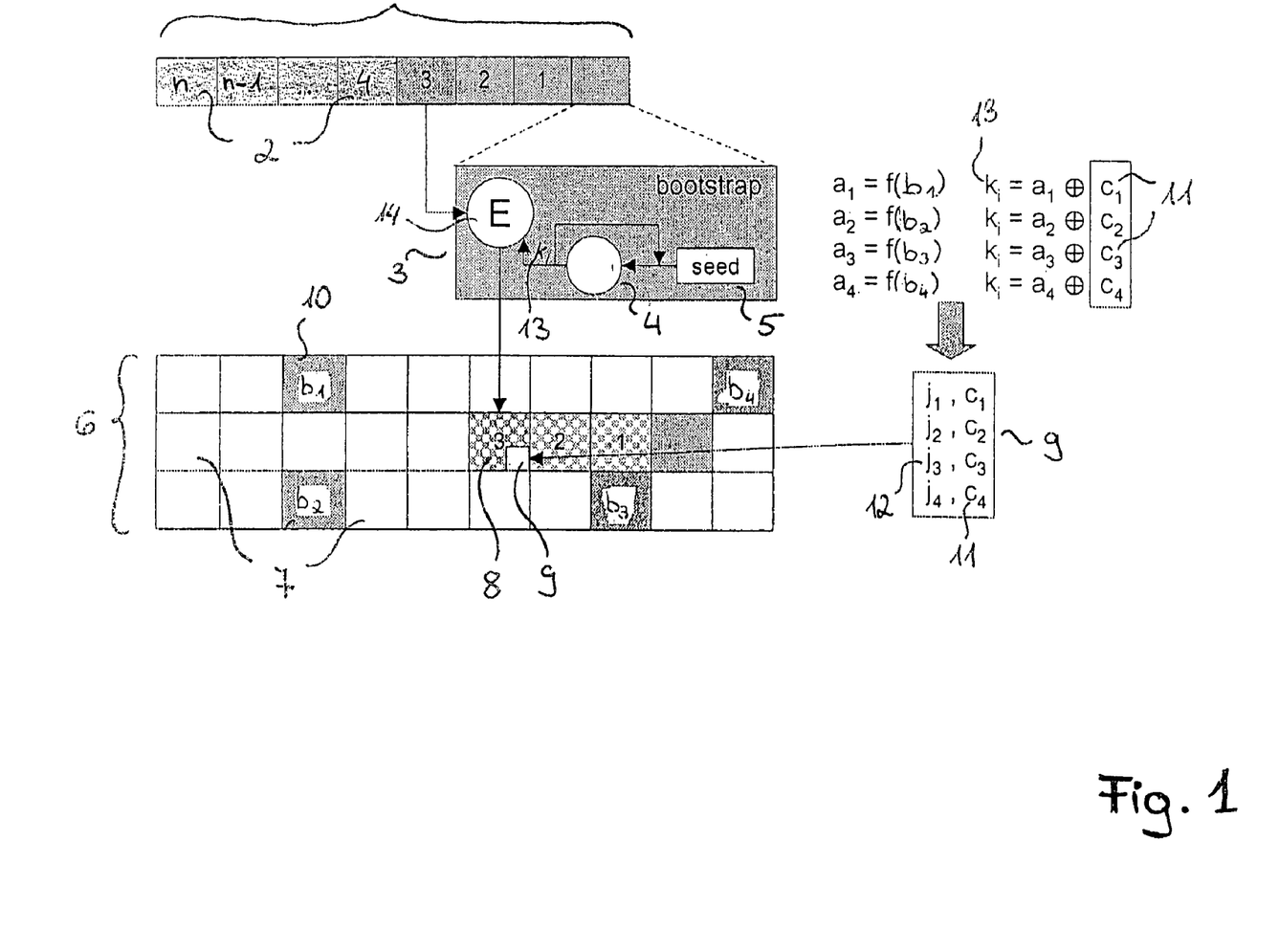
FIG. 1 is a block diagram showing schematically the elements involved in embedding the digital content.
Figure 3:
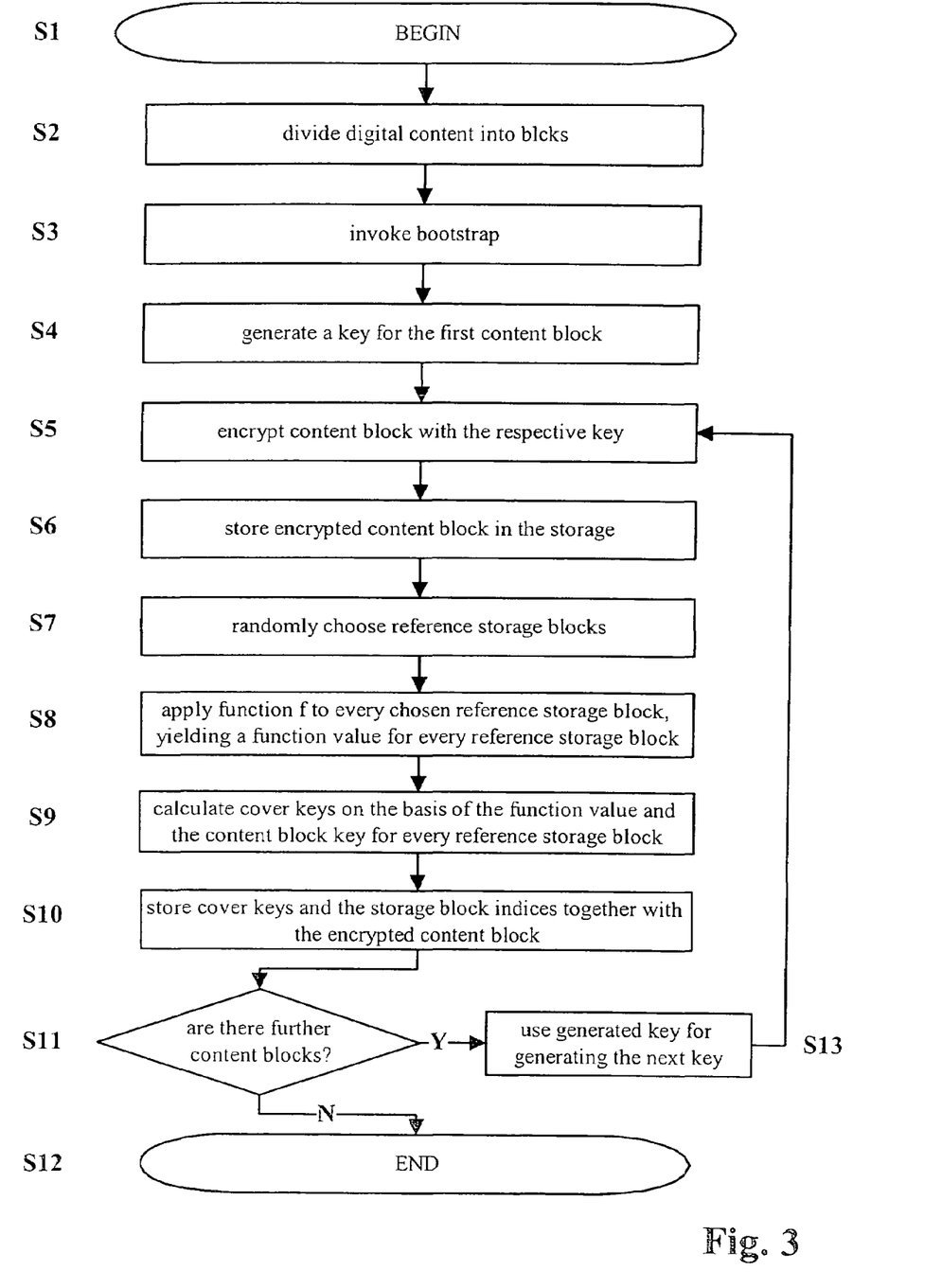
FIG. 3 is a flow chart showing the process of embedding the digital content.

With reference to FIG. 1 the elements involved in embedding the digital content into the storage and with reference to FIG. 3 the steps of embedding the digital content will be explained.

The process begins with a first step S1, for example with downloading the digital content 1 or starting the execution of the digital content 1.

Hereby, the digital content 1 is stored on a storing medium like a hard disk, a CD, a floppy disk, a DVD or any other portable or non-portable device adapted to store data on it. The provider of the digital content 1 may either submit a storage medium comprising the digital content 1 to a user or the user himself can download the digital content from a server, a computer or the like when accessing the internet or any other network able to transmit data or information.

The digital content 1 comprises a bootstrap section 3, which is a part of the active part of the digital content 1 and responsible for providing methods for the protection of the digital content. The active part also implements methods governing the usage of the digital content such as replay and copying. That way it reflects the usage rules devised by the content provider. This includes, that the digital content 1 can only be downloaded once from the content provider by the user or executed once from the recording medium on which it is stored.

A reproducing apparatus, e.g. a computer, a DVD player, a gaming console, a mobile phone or the like, has a processing unit able to access the digital content 1 stored on the above mentioned storing medium. This means, that the digital content 1 is either stored in a storage of the reproducing apparatus itself or the reproducing apparatus comprises means for reading data or information stored on an external recording medium.

The digital content 1 may be an audio file, an image, a video sequence, a film, a screen saver, a computer program or any other application. If the user via a menu or the like starts the downloading of the digital content 1 or the execution of the digital content 1 stored on a storing medium devised by the provider, or if the user wants to store or install the digital content 1 in a storage 6 in any other way, then the digital content 1 is stored and embedded in the storage 6 according to the method as explained below. For executing the digital content 1 stored and embedded in the storage 6, for example playing an audio file or running a program, the method for retrieving and controlling if the user has the appropriate user rights is executed. In this case the processing unit accesses the digital content 1 stored in the storage 6 and starts the execution of the method for copy protection as explained below.

The storing and embedding of the digital content into a storage 6 and the retrieving and execution of the digital content if the user has the appropriate user rights is controlled by the bootstrap section 3 being a part of the active part of the digital content 1.

In the next step S2 the digital content 1 is divided into n digital content blocks 2 and into a bootstrap section 3, n being a positive integer number. As already explained, the digital contents consist of a passive part, which is digital content, such as still images, audio tracks, video sequences or any other kind of information and of an active part, which is some form of executable code capable of inverse transforming the passive part and thus making it available for consumption, e.g. output on a display, a loudspeaker or the like. The bootstrap section 3 hereby is a part of +the active part and responsible for embedding and retrieval of the digital content blocks 2. The division of the digital content 1 into digital content blocks 2 may either already be performed at the content provider side or may be performed by the bootstrap section 3 as soon as it is invoked. Hereby, the bootstrap section 3 is implemented as tamper resistant software, which means that an attacker may observe and modify software execution, but neither gain any useful information nor being able to modify execution in a purposeful way. Thereby it is ensured, that the digital part and especially the bootstrap section 3 is executed in a way that reflect the intention of the content provider.

It is to be noted, that also the bootstrap section 3 itself is a digital content block, but is not copy protected as the digital content blocks 2 of the passive part. The bootstrap section 3 supervises the copy protection of the digital content blocks 2 of the passive part. Therefore in the following the expression digital content block is referring to the digital content blocks of the passive part not including the bootstrap section.

Hereby, the processing unit of the reproducing apparatus accesses the bootstrap section 3 of the digital content 1 and thus makes it possible to execute the steps for copy protection of the digital content 1. The bootstrap section 3 as already explained is a part of the digital content 1 and is stored together with the digital content blocks 2 in the storage 6.

The bootstrap section 3 contains a key stream generator 4 for generating keys $k_i$ for encrypting or decrypting the digital content blocks 2. Hereby, for every of the i digital content blocks 2, i=1, 2 . . . n, the respective key $k_i$ is generated. The key stream generator 4 is fed with a seed 5. Hereby, always the same seed 5 is used and both the key stream generator 4 and the seed 5 are hidden by tamper resistant software and cannot be obtained by an attacker. In a next step S3 the bootstrap 3 is invoked, i.e. by the processing unit accessing the digital content 1 and therefore the bootstrap section 3, and in step S4 the key stream generator 4 generates the first key $k_i$ for the first digital content block 2. Hereby, the generation of the key is started by feeding a seed 5 to the key stream generator 4. In step S5 the first digital content block 2 is then encrypted with the first key k, in the encryption section 14.

As the same seed 5 is used, the key stream generator 4 generates the keys $k_i$ always in the same order and the keys $k_i$ are used as well for encrypting as for decrypting. Further, after having used one key $k_i$ for encrypting the associated digital content block 2, this key $k_i$ is fed back to the key stream generator 5 and used for generating the next key $k_{i+1}$.

Hereby, the encrypting of the digital content blocks 2 may be already performed at the content provider side, i.e. the digital content blocks 2 have already been encrypted when they arrive at the user.

In the next step S6, the encrypted digital content block 8 is then stored in a storage 6. The storage 6 is hereby divided into several storage blocks 7 and the encrypted digital content block 8 is stored in one of the storage blocks 7.

The process of embedding a digital content block is shown in FIG. 1 taking as example the digital content block number 3. The digital content block number 3 is encrypted in the encryption section 14 with the respective key $k_3$. The encrypted digital content block 8 is then stored in the storage 6 and the key $k_3$ is fed back to the key stream generator 5 for being used for the generation of the next key $k_4$.

In the next step S7 the bootstrap 3 randomly chooses 1 reference storage blocks $b_1$, whereby preferably $0 \leq 1 < n$. In the present example shown in FIG. 1, four reference storage blocks $b_1$ to $b_4$ are chosen. Hereby, every storage block 7 can be chosen as reference storage block 10 with exception of storage blocks 7 containing encrypted digital content blocks 8.

It is to be noted, that for every key $k_i$ 1 reference storage blocks $b_1$ are randomly chosen. That means, that the steps S7 to S10 are repeated for every single digital content block i having the associated key $k_i$. Hereby, the number 1 of the chosen reference storage blocks may differ for every digital content block.

In the following step S8 the bootstrap section 3 applies a function f to each reference storage block $b_1$, yielding values $a_1$. In the present example according to FIG. 1, four values $a_1$ to $a_4$ are obtained being the function values of applying the function f to $b_1$ to $b_4$. This can be represented as in FIG. 1 by the equations $a_1 = f(b_1)$. The function f hereby is also protected by means of temper resistance and therefore not available to an attacker. Further, function f may have every possible form, and the complexity of f influences the level of copy protection, i.e. the more complex the function f is, the more discouragement of copying data can be achieved.

Depending on the function values $a_i$ and the key $k_3$ used for encrypting the actual digital content block 2, cover keys 11 are calculated in step S9. In the present example, four cover keys $c_1$ to $c_4$ are calculated on the basis of $k_3$ and $a_1$ to $a_4$, respectively. These cover keys 11 are used for verifying user rights when retrieving the embedded digital content, as will be explained later.

For calculating one cover key 11, one function value $a_1$ and therefore one referenced storage block 10 has been used. This means, that a block index 12 indicating the position in the storage 6 of a reference storage block 10 can be associated to a cover key 11. In step S10 the cover keys 11 and storage block indices 12 indicating the position of the reference storage blocks 10 in the storage 6 are stored together with the encrypted digital content block 8 in the storage 6. In the present example, the block indices $j_1$ to $j_4$ being related to the reference storage block $b_1$ to $b_4$ used for calculating the cover keys $c_1$ to $c_4$ are stored together with the cover keys $c_1$ to $C_4$ and together with the encrypted digital content block 8. Hereby, the cover keys 11 and indices 12 may be additionally protected by the bootstrap 3, e.g. through encryption. This means that in the storage 6 together with every encrypted digital content block 8 information 9 is stored containing the block indices 12 of the reference storage blocks 10 used for embedding the digital content block 2, and the cover keys 11 calculated on the basis of the used reference storage blocks 10, the used key $k_i$ for encrypting the digital content block 2 and the function f.

Now in step S11 the bootstrap 3 checks if there are further digital content blocks 2 which have to be embedded in the storage 6.

If not, the process ends in a step S12 otherwise in step S13 the key stream generator 5 generates the next key $k_{i+1}$, or in the present example the next key $k_4$, for the next digital content block 2 and the process goes back to step S5 and the next digital content block 2 is encrypted with the respective key.

Figure 2:
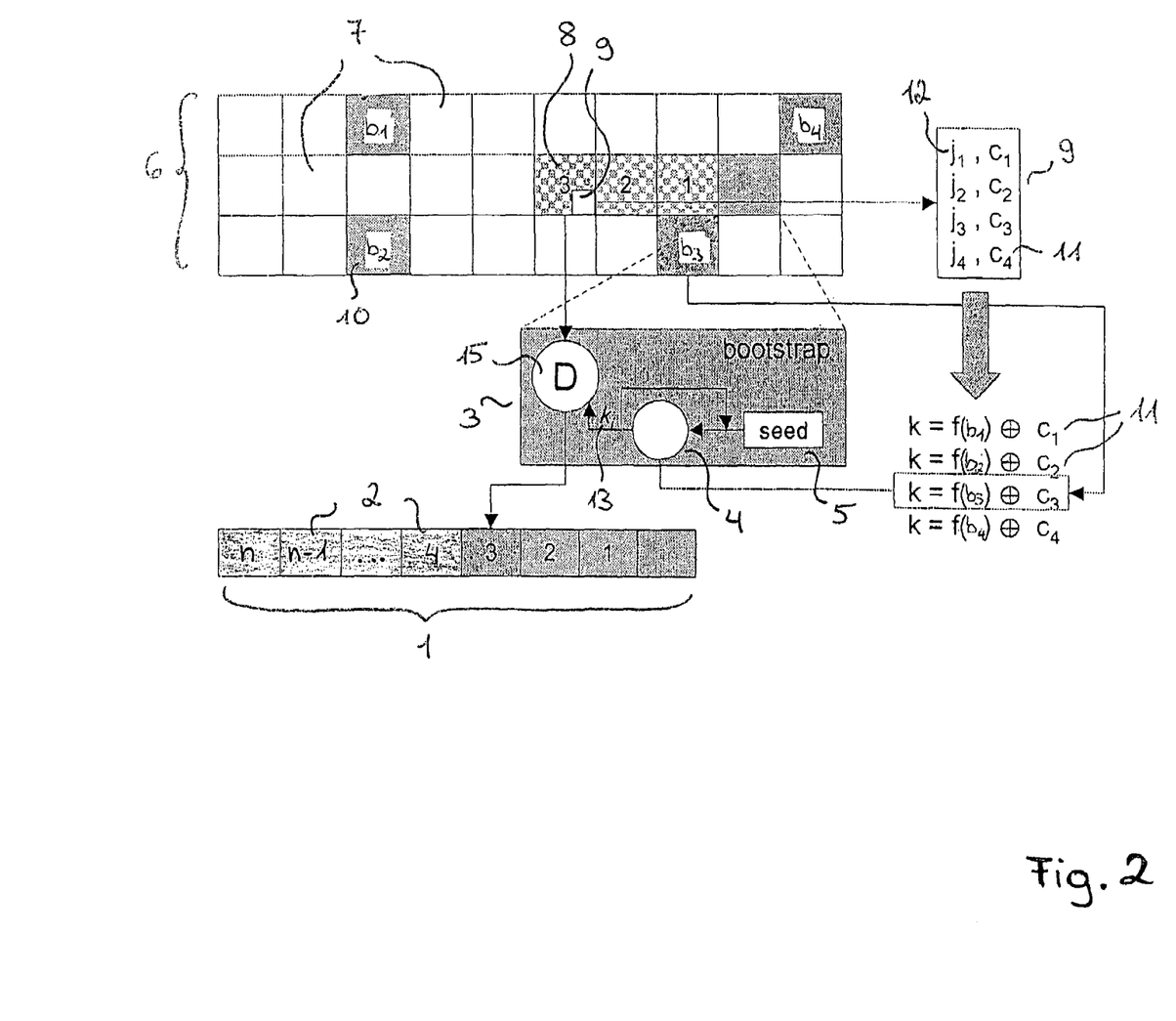
FIG. 2 is a block diagram showing schematically the elements involved in retrieving the digital content.

With reference to FIG. 2 the elements involved in retrieving the encrypted and embedded digital content and with reference to FIG. 3 the steps of retrieving the encrypted and embedded digital content will be explained.

Hereby, retrieving can comprise the execution of the digital content 1, for example the playing of a movie or a sound, the starting of a program or an application, or the legal copying of the digital content to another storage. Dependent on the user rights set by the content provider, the bootstrap section 3 control the retrieving of the embedded digital content 1.

Figure 4:
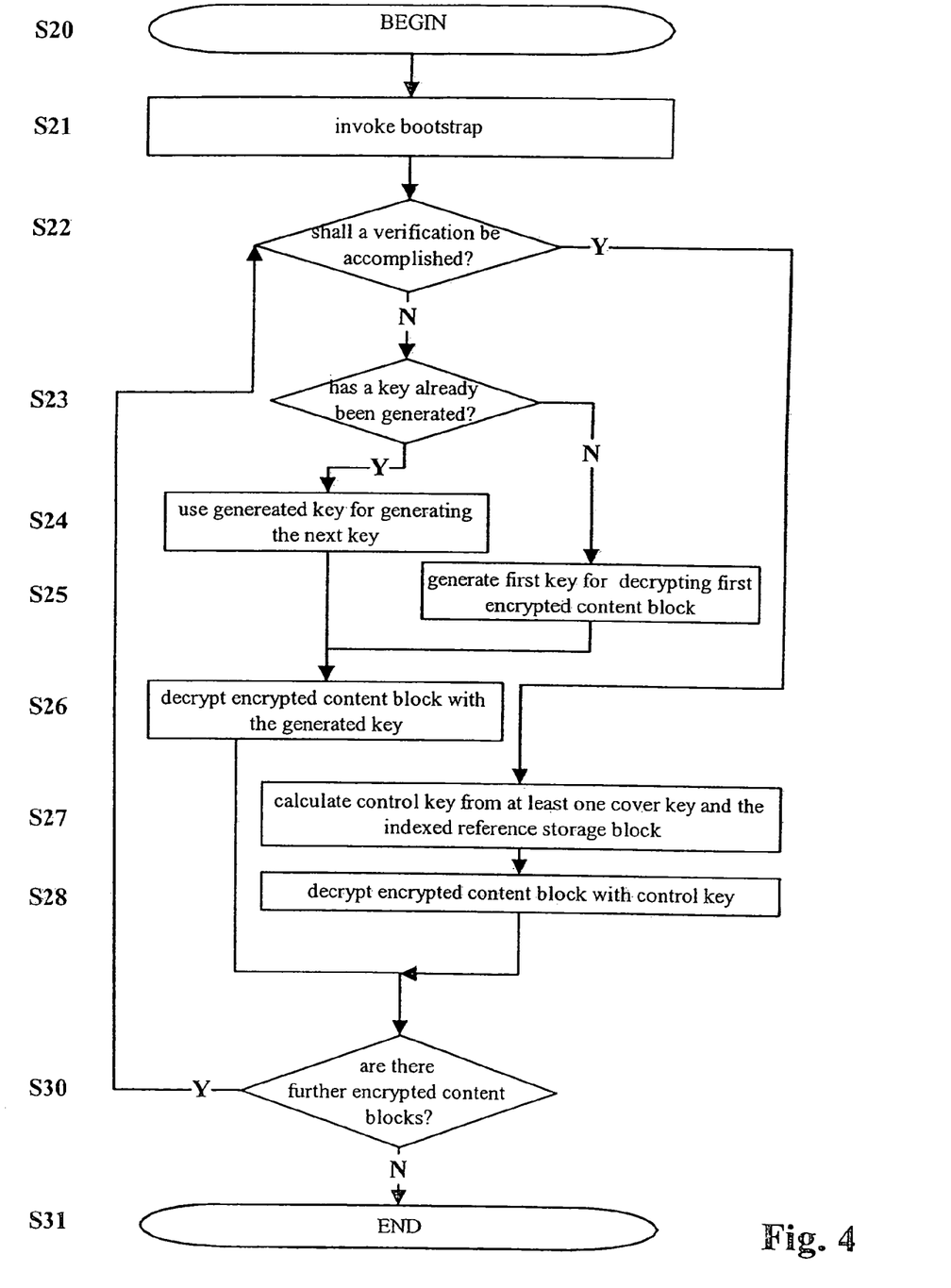
FIG. 4 is a flow chart showing the process of retrieving the encrypted and embedded digital content and FIG. 5 is flow chart showing the process of managing the storage into which the digital content is to be embedded.

The process starts in with step S20, for example by starting the use or replay of the embedded digital content by a user. In step S21 the bootstrap section 3 is invoked.

In step S22, the bootstrap 3 decides whether for the next embedded digital content block 8 a verification of the dependencies shall be accomplished.

If not, then in the next step S23 the bootstrap section checks, if there has already a key been generated. Otherwise the process continues with step S 27.

If in step S 24 the bootstrap section 3 finds, that a key has already been generated, then in the next step S25 this key $k_i$ is fed to the key stream generator 4 and used for generating the next key $k_{i+1}$. Otherwise, in step S 25 the first key $k_1$ for decrypting the first encrypted digital content block 8 is generated.

Then in step S 26 the generated key $k_i$ is used for decrypting the respective encrypted digital content block 8.

After the decryption in the step S26 the bootstrap section 3 in step S30 checks, if there are further encrypted digital content blocks 8 which have to be decrypted. If not, the process ends in step S31 with the successful retrieving of the embedded digital content 1, for example with the playing of the sound or movie, the starting of a program or application or the legal copying of the digital content 1 to another storage.

Otherwise, if in step S30 the bootstrap section 3 finds, that there are further encrypted digital content blocks 8 that have to be decrypted, the process continues with step S22, where the bootstrap section decides, if a verification of the dependencies shall be accomplished.

If the bootstrap section 3 randomly chooses that a verification shall be accomplished then in step S27 a control key $k_i'$ is calculated. For calculating this control key $k_i'$ the bootstrap section 3 reads out the cover keys 11 and the storage block indices 12 stored together with the encrypted digital content block 8. According to the process for embedding the digital content block, the same function f is applied to at least one of the reference storage blocks 10 yielding function values, which are then used together with the cover keys to calculate at least one control key $k_i'$. It is to be understood, that in case that the referenced storage blocks 10 are the same storage blocks that were used for embedding the digital content 1, then the control key $k_i'$ will correspond to the key $k_i$ used for encrypting the digital content block 2.

In the next step S28 the encrypted digital content block 8 is decrypted with the calculated control key $k_i'$. The process then continues with step S22, where the bootstrap section 3 decided on the verification.

If after generating a control key $k_i'$ and decrypting the encrypted digital content block 8 with said control key for the next encrypted digital content block 8 no verification has to be accomplished, then the generated control key $k_i'$ is fed back to the key stream generator 4 for generating the next key $k_{i+1}$.

In case the verification of the reference storage blocks 10 fails which results in a false generated control key, and if the false control key is fed back to the key stream generator 4, then all subsequent keys $k_i$ will be corrupted and thus not being correctly generated, which results in a false decryption of all following encrypted digital contents.

This means that a large number of dependencies with reference storage blocks 10 is created for each digital content block 2 during embedding. Upon retrieval, for some digital content blocks 8, one or a small number of these dependencies are verified. Once a verification fails, the remaining encrypted digital content blocks 8 cannot be retrieved and the replay of the digital content 1 will stop or not start at all. Even in case that the decryption process after the generation of a false control key continues, at least parts of the digital content will not be properly decrypted. For example a mp3 player or a media player needing a certain data format will not be able to play the decrypted digital content as the needed data structure is not existent.

To ensure successful replay at a destination location, an attacker would have to copy all reference storage blocks 10 that where referenced by the digital content blocks 2 during embedding, and make each of these reference storage blocks 10 accessible in the destination storage via its original block index $j_1$, i.e. the index used in a source storage. This means, that the above described implementation meets the goal of tying the digital content 1 to a large amount of embedding data, while verification of the presence of this data is possible with a low computational overhead.

For the algorithm described above, copying some digital contents 1 means to invoke it from its first storage and to let it embed itself in a destination storage. The embedding at the destination storage will follow the same procedures as laid out above.

Additionally, digital contents have to provide means for making legal copies of contents but at the same time to modify the destination copy in a way that reflects its usage rules. For example, the destination copy may be modified by the digital part of the digital content in such a way, that it can only be replayed once. Also, when copying between storages of different sizes is accomplished, adjustments to the copy can be made. For example, digital content that is stored in a very large storage can be embedded with dependencies on vast amounts of data and thus rely on a high level of copy discouragement. When copying from this large storage to a small storage, e.g. a flash memory card, a much lower level of discouragement can be expected from the destination copy. In this situation, the digital content can irreversibly reduce the quality of the copy. This would e.g. prevent the use of small mobile storages as transport media for digital contents.

Figure 5:
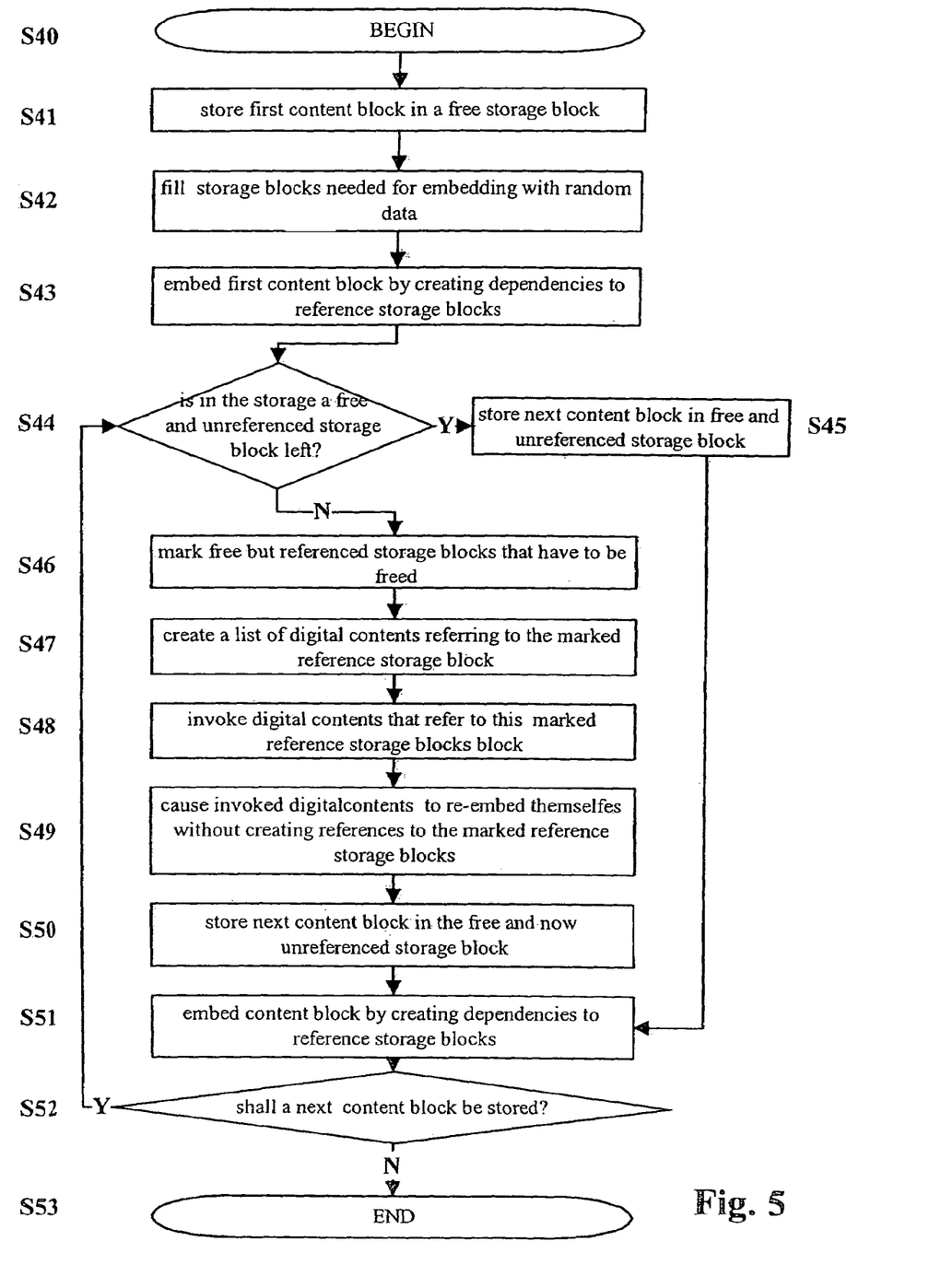

FIG. 5 shows the process of administrating the storage blocks 7 of the storage 6 into which the digital content 1 is to be embedded. The process begins in step S40 for example with downloading or copying the digital content 1 to a new storage 6. In step S41 the first encrypted digital content block 8 is stored in a free storage block 7. In the next step S42 free storage needed for the embedding the digital content 1 are filled with random data. The more storage blocks are used for embedding, the higher is the copy protection.

Then, in step S43 the first encrypted digital content block 8 is embedded by creating dependencies to randomly chosen reference storage blocks 10 as explained above, whereby the reference storage blocks are randomly chosen out of the number of storage blocks filled with random data in step S42.

In step S44 the bootstrap section 3 checks, if there is a free and unreferenced storage block in the storage left. Unreferenced hereby means, that the storage block has not been used a reference storage block for embedding digital content 1. If yes, then in step S45 the next encrypted digital content block 8 is stored in the free and unreferenced storage block 7 and in step S51 the stored encrypted digital content block 8 is again embedded into the storage by creating dependencies to other randomly chosen reference storage blocks 10.

If in step S44 the bootstrap section 3 detects, that no free and unreferenced storage block 7 is left, then in the next step S46 free, that means free or filled with random data, but referenced storage blocks 10 are marked. Hereby, only as much free but referenced storage blocks are marked as have to be freed for continuation of the process.

In step S47 a list is created containing all digital contents 1 belonging to digital content blocks 8 referring to the marked reference storage blocks 10. In step S48 all the digital contents 1 that refer to the marked reference storage blocks 10 are invoked and in step S49 the invoked digital contents 1 re-embed themselves without creating references to the marked reference storage blocks 10, which means that they create references to other reference storage blocks 10 but not to the marked reference storage blocks 10. Now, the marked storage blocks are free and unreferenced and therefore in the next step S50 the next digital content block 8 can be stored in one of the now unreferenced and free storage blocks.

Then, in step S51 the stored digital content block 8 is embedded by creating references to other randomly chosen reference storage blocks 10. In step S52 the bootstrap checks if there is a next digital content block 2 which has to be stored and embedded. If this is the case, then the process goes back to step S44 where the bootstrap section 3 checks if there is a free and unreferenced storage block in the storage list. Otherwise, the process ends in step 53.

In case, that the digital content 1 has to be embedded in a storage 6, where not enough space is available for filling a number of free storage blocks 7 needed for the embedding with random data, then the dependencies are created to other randomly chosen reference storage blocks comprising any data.

Hereby, the method of embedding and retrieving is independent from any operating system, e.g. Windows, Linux, MaC or the like, as the method does not access system specific data or programs.

The invention claimed is:
1. A computer-implemented method for copy protection of digital content, wherein at least a part of the digital content is an active part implemented as a computer-implemented process enabling execution of the digital content, comprising:
   storing in a computer readable storage medium digital content in a first area of the storage medium;
   choosing a plurality of reference storage blocks from at least another area of the storage medium;
   creating dependencies between the digital content and the reference storage blocks;
   accessing with a computer the digital content with the active part only after verifying an accuracy of the depen- dencies with a position of the reference storage blocks in the storage medium and a content of the reference storage blocks;

dividing the digital content into content blocks;

feeding a seed to a key stream generator for generating a key;

encrypting a first content block with the generated key;

calculating cover keys based on the key and the reference storage blocks for verifying the dependencies; and storing the cover keys and storage block indices of the reference storage blocks together with the encrypted digital content block in the storage medium.

2. The method according to claim 1, further comprising:

feeding the generated key back to the key stream generator for generating a next key for encrypting a next content block.

3. The method according to claim 2, further comprising:

repeating the creating dependencies step for every content block.

4. The method according to claim 3, further comprising:

decrypting the encrypted content block including generating a first key for decrypting a first encrypted active content block, decrypting an encrypted active content block with a respective key, repeating the generating and decrypting steps for a next encrypted content block, and choosing encrypted content blocks randomly for verifying user rights.

5. The method according to claim 4, further comprising:

verifying the dependencies to verify a presence of reference storage blocks including reading out at least one of the cover keys and the storage block indices stored together with the encrypted content block, calculating a control key using at least one of the cover keys and at least one of the reference storage blocks indicated by the indices, and using the control key for decrypting the encrypted content block.

6. The method according to claim 4, further comprising:

feeding the generated key or a calculated control key back to the key stream generator for generating the next key for decrypting the next encrypted content block in case that no verification has to be accomplished.

7. A computer-readable storage medium including computer-readable instructions that when executed by a processor perform steps comprising:

copy protecting digital content including storing in a computer readable storage medium digital content in a first area of the storage medium;

choosing a plurality of reference storage blocks from at least another area of the storage medium;

creating dependencies between the digital content and the reference storage blocks; and accessing with a computer the digital content with the active part only after verifying an accuracy of the dependencies with a position of the reference storage blocks in the storage medium and a content of the reference storage blocks;

dividing the digital content into content blocks;

feeding a seed to a key stream generator for generating a key;

encrypting a first content block with the generated key;

calculating cover keys based on the key and the reference storage blocks for verifying the dependencies; and storing the cover keys and storage block indices of the reference storage blocks together with the encrypted digital content block in the storage medium.

8. A reproducing apparatus, for copy protection of digital content, wherein at least a part of the digital content is an active part implemented as a computer-implemented process enabling execution of the digital content, the reproducing apparatus comprising:

a data processing unit, configured to access digital content stored on a computer-readable storage medium, the digital content accessed with the active part only after verifying an accuracy of the dependencies with a position of the reference storage blocks in the storage medium and a content of the reference storage blocks;

a storing unit configured to store digital content in a first area of a storage medium;

a reference storage block selection unit configured to choose a plurality of reference storage blocks from at least another area of the storage medium;

a dependency creation unit configured to create dependencies between the digital content and the reference storage blocks;

a dividing unit configured to divide the digital content into content blocks; a seed feeding unit configured to feed a seed to a key stream generator for generating a key;

an encrypting unit configured to encrypt a first content block with the generated key;

a calculating unit configured to calculate cover keys based on the key and the reference storage blocks for verifying the dependencies; and a key storing unit configured to store the cover keys and storage block indices of the reference storage blocks together with the encrypted digital content block in the storage medium.

\* \* \* \* \*